I. H. STEWART.
ROLLER BEARING BED FOR THRESHING CHAINS.
APPLICATION FILED MAR. 26, 1915.

1,192,471.

Patented July 25, 1916.

Witnesses

Inventor
T. H. Stewart,
By
Attorney

UNITED STATES PATENT OFFICE.

THADEOUS H. STEWART, OF RIVERSIDE, OKLAHOMA.

ROLLER-BEARING BED FOR THRESHING-CHAINS.

1,192,471.

Specification of Letters Patent.

Patented July 25, 1916.

Application filed March 26, 1915. Serial No. 17,227.

*To all whom it may concern:*

Be it known that I, THADEOUS H. STEWART, a citizen of the United States, residing at Riverside, in the county of Beaver and State of Oklahoma, have invented a new and useful Improvement in Roller-Bearing Beds for Threshing-Chains, of which the following is a specification.

This invention relates especially to a roller bed for chains, used in connection with broom seed threshers.

In the threshers now in practical use a heavy chain provided with teeth is employed and said chain travels across the thresher bed. This creates considerable friction and not only causes a waste of power but so wears the chain that it is usually necessary to renew it each season.

My invention consists essentially of a frame having a plurality of rollers which replaces that portion of the bed over which the chain travels, thereby greatly reducing the friction and saving power, and also avoids the repeated expense of renewing the chain each year, as there is practically no wear with the rollers.

Figure 1:
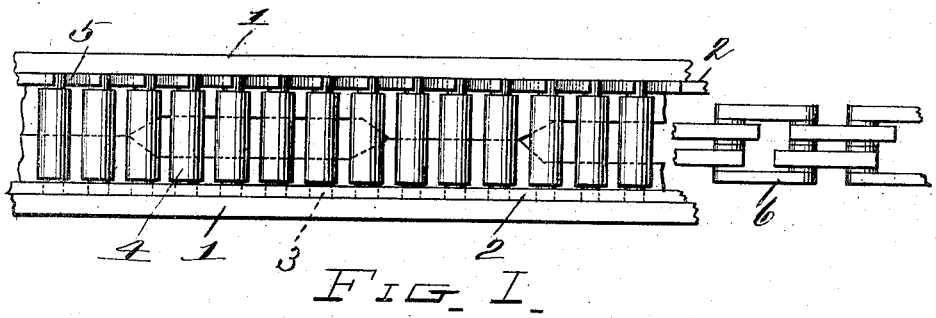
Figure 2:
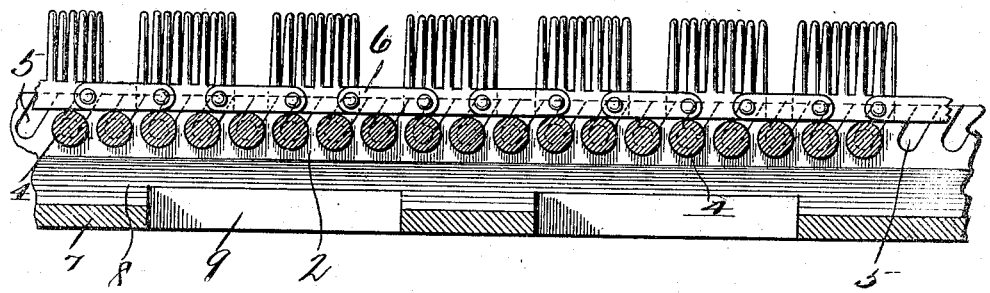
Figure 3:
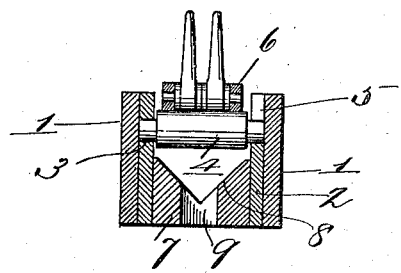

In the accompanying drawings: Figure 1 is a plan view of a portion of said chain bearing, a portion of the chain links being indicated in full lines, the teeth being omitted. Fig. 2 is a vertical horizontal section through the bearing, the end portions being broken away and a portion of the chain being shown thereupon in elevation. Fig. 3 is a cross section through the bearing.

In these drawings 1 represents vertically arranged parallel side members spaced apart and preferably formed of planks. The inner faces of said planks are suitably faced with metal plates 2. One of these plates is provided with suitable openings 3 to receive the reduced end portions of rollers 4 and the other plate is provided with obliquely arranged slots 5 rounded at their inner ends to form bearings for the opposite reduced ends of the rollers 4. By means of this construction any individual chain can be quickly lifted out of position and a new roller readily inserted. Over these rollers run the chain 6. The slots 5 are inclined in the direction of the travel of the chain, so that the brush will not catch in the slots.

The members 1 and plates 2 form practically a long trough or box, and a bottom member 7 is provided which rests between the plates 2 and may be one of the means employed for holding said plates in position, any other means being provided which may be found necessary or convenient. The bottom 7 has cut in its upper surface a V-shaped groove 8 and is provided with a number of longitudinal slots 9 and as indicated in the drawings the said bottom member is preferably formed of two longitudinal sections, although if constructed of metal it might be formed in one piece. Openings 9 serve to discharge from the box any material which during the threshing operation might fall between the rollers, and which might otherwise accumulate and choke their operation.

From the above description the purpose, utility and construction of the device will be apparent to those familiar with threshing devices of this particular type.

What I claim is:—

1. A device of the kind described comprising side members, plates arranged adjacent the inner faces of said side members, rollers removably seated in said plates, a bottom member below said rollers, said bottom member having a V-shaped groove upon its upper surfaces and being provided with longitudinal slots, and a thresher chain adapted to travel on said rollers.

2. The combination with a broom seed thresher having a chain, of vertically arranged plates spaced apart, one of said plates being provided with circular openings and the other plate being provided with obliquely arranged slots rounded at their inner ends, said slots inclining in the direction of the travel of the chain, and rollers having reduced end portions fitting respectively in said circular openings and said slots, as and for the purpose set forth.

THADEOUS H. STEWART.

Witnesses:
 ELMER L. FICKEL,
 C. T. McCUNE.

Copies of this patent may be obtained for five cents each, by addressing the "Commissioner of Patents, Washington, D. C."